(12) United States Patent
Al-Basheer et al.

(10) Patent No.: US 10,126,172 B1
(45) Date of Patent: Nov. 13, 2018

(54) FARADAY ROTATOR DEVICE

(71) Applicant: King Fahd University of Petroleum and Minerals, Dhahran (SA)

(72) Inventors: Watheq Al-Basheer, Dhahran (SA); Sohaib Abdelazem, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/784,309

(22) Filed: Oct. 16, 2017

(51) Int. Cl.
G01J 4/04 (2006.01)
F21V 23/00 (2015.01)
F21Y 115/10 (2016.01)

(52) U.S. Cl.
CPC .............. *G01J 4/04* (2013.01); *F21V 23/003* (2013.01); *F21Y 2115/10* (2016.08)

(58) Field of Classification Search
CPC ........................................................ G01J 4/04
USPC ........................................................ 356/368
See application file for complete search history.

(56) References Cited

U.S. PATENT DOCUMENTS

| | | | | |
|---|---|---|---|---|
| 2,933,972 A * | 4/1960 | Wenking | .................... | G01J 4/04 356/368 |
| 2,973,684 A * | 3/1961 | Nisle | ...................... | G01N 21/21 250/204 |
| 2,974,561 A * | 3/1961 | Hardy | ...................... | G01J 4/04 356/368 |
| 2,976,764 A * | 3/1961 | Hyde | ........................ | G01J 4/04 250/225 |
| 3,167,751 A | 1/1965 | Kelner et al. | | |
| 3,312,141 A * | 4/1967 | Cary | ........................ | G01J 4/04 356/217 |
| 3,502,978 A | 3/1970 | Georges et al. | | |
| 3,510,226 A * | 5/1970 | Cary | ........................ | G01J 4/04 356/364 |
| 3,738,756 A * | 6/1973 | Chaney | .................. | G01N 21/21 250/225 |
| 3,740,151 A * | 6/1973 | Chaney | .............. | G01N 21/1717 250/225 |
| 6,166,807 A * | 12/2000 | Kawamura | ............... | G01J 4/00 356/364 |
| 6,392,784 B1 | 5/2002 | Ikeda et al. | | |
| 6,466,320 B1 * | 10/2002 | Kawamura | ............... | G01J 4/00 356/364 |
| 6,620,622 B1 * | 9/2003 | Kawamura | ............ | G01N 21/21 250/225 |

(Continued)

*Primary Examiner* — Roy M Punnoose
(74) *Attorney, Agent, or Firm* — Oblon, McClelland, Maier & Neustadt, L.L.P.

(57) ABSTRACT

A Faraday rotation device includes a light source configured to transmit a light beam; a first rotation stage polarizer configured to forward the light beam from the light source at a predetermined reference polarization angle; a quartz cell configured to receive the light beam from the first rotation stage polarizer at the predetermined reference polarization angle; one or more stacked ring permanent magnets coaxially fitted around the quartz cell; a stepper motor configured to adjust a rotational motion of a second rotation stage polarizer connected to the stepper motor, wherein the second rotation stage polarizer is configured to change a polarization angle of the light beam received from the quartz cell; a light detector; and an electronic circuit board configured to record a change in angle between the predetermined reference polarization angle and the changed polarization angle.

18 Claims, 6 Drawing Sheets

(56) References Cited

U.S. PATENT DOCUMENTS

| | | | |
|---|---|---|---|
| 6,934,023 B2 * | 8/2005 | Kawamura | G01N 21/21 356/364 |
| 7,239,904 B2 * | 7/2007 | Hirao | A61B 5/14558 600/310 |
| 8,922,773 B2 * | 12/2014 | Wagner | G01J 4/00 356/364 |
| 9,423,635 B1 | 8/2016 | Cameron et al. | |
| 2012/0236306 A1 * | 9/2012 | Ostermeyer | G01N 21/03 356/364 |

\* cited by examiner

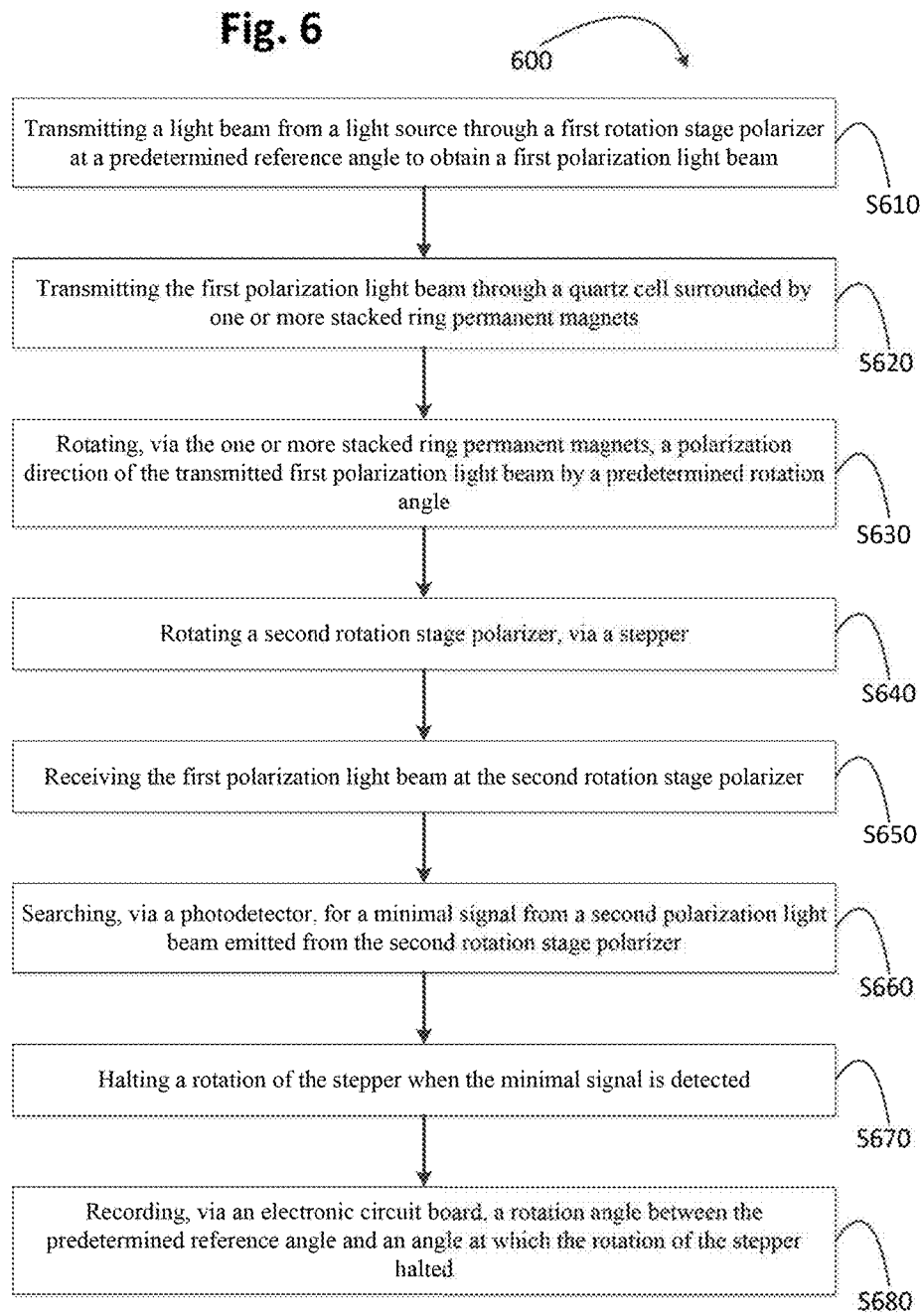

FARADAY ROTATOR DEVICE

BACKGROUND

Technical Field

The present invention relates to a Faraday rotator device and a method of recording a Faraday rotation angle.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It has previously been established that if an isotropic transparent material, such as a solid, liquid, or gas organic or inorganic material is placed in a strong uniform magnetic field and a beam of linearly polarized light is passed coaxially and parallel with the direction of magnetic field lines through the isotropic transparent material, then a significant rotation in the direction of polarization of the transmitted light is observed. See P. N. Schatz and A. J. McCaffery, Q. Rev., Chem. Soc. 23, 552 (1969); A. Comey, Atomic and Laser Spectroscopy~Clarendon, Oxford, 1988, Chap. 15; D. Budker, V. Yashchuk, and M. Zolotorev, 'Nonlinear magneto-optic effects with ultra-narrow widths," Phys. Rev. Lett. 81~26, 5788-5791 (1998); C. Y. Chang, L. Wang, J. T. Shy, C. E. Lin, and C. Chou, Rev. Sci. Instrum. 82, 063112 (2011); and J. T. Singh, P. A. M. Dolph, W. A. Tobias, T. D. Averett, A. Kelleher, K. E. Mooney, V. V. Nelyubin, Y. Wang, Y. Zheng, and G. D. Cates, Phys. Rev. C 91, 055205 (2015), each incorporated herein by reference in their entirety. This rotation is commonly known as a Faraday rotation, which is different from the optical rotation experienced by linearly polarized light passing through chiral transparent samples without the effect of a magnetic field.

The Faraday rotation can be explained by imagining linearly polarized light as the coherent superposition of two opposite components of the net polarization that have different frequencies. If one of the polarized light components has a frequency $\omega+\omega_L$ possessing a refractive index $n_+$ then the other component has a frequency $\omega-\omega_L$ with a refractive index $n_-$.

where $\omega_L$ is the Larmor frequency and is directly related to electron oscillations within the atoms, due to their interaction with an external magnetic field B and is given as:

$$\omega_L = \frac{e}{m} B \qquad (1)$$

Where e: charge of the oscillating electrons
m: mass of the oscillating electrons
B: magnetic flux density Mathematically, the angle of rotation φ (in degrees) can be given in terms of the refractive indices of polarized light components ($n_+$, $n_-$), the speed of light c, the magnetic flux density B and the frequency of transmitted light ω as:

$$\Phi = \frac{\omega(n_+ - n_-)}{2c} B = VBL \qquad (2)$$

The right hand side of equation (2) is the common form of the Faraday rotation angle equation where L is the length of the transparent material (cell length), and V is the Verdet's constant (degrees of rotation/Tesla.m) which is given as:

$$V = -\frac{e\lambda}{2 \text{ mc}} \frac{dn}{d\lambda} \qquad (3)$$

where $$\frac{dn}{d\lambda} = -\frac{2B}{\lambda^3}$$

is the dispersion of the refractive index of the transparent material, which is derived from the Cauchy equation $$\left(n = A + \frac{B}{\lambda^2}\right).$$

Note that B in the dispersion equation above is not the magnetic field flux, but rather it is one of Cauchy's constants and is dependent on the intrinsic optical properties of the transparent material. By substituting the dispersion equation in equation (3), a clear inverse dependence of Verdet's constant on the square of the wavelength of transmitted light can be deduced. In other words, the Faraday Rotation angle for a certain isotropic transparent sample is expected to be optimal for transmitted light of a shorter wavelength for a relatively long cell, as well as for a high magnetic field flux B. See I. B. Khriplovich and S. K. Lamoreaux, "CP Violation without Strangeness. The Electric Dipole Moments of Particles, Atoms and Molecules," Springer-Verlag, New York, 1997, incorporated herein by reference in its entirety.

SUMMARY

In one embodiment, a Faraday rotation device includes a light source configured to transmit a light beam; a first rotation stage polarizer configured to forward the light beam from the light source at a predetermined reference polarization angle; a quartz cell configured to receive the light beam from the first rotation stage polarizer at the predetermined reference polarization angle; one or more stacked ring permanent magnets coaxially fitted around the quartz cell, the one or more stacked ring permanent magnets configured to create a magnetic field encircling the quartz cell and rotate the light beam; a stepper motor configured to adjust a rotational motion of a second rotation stage polarizer connected to the stepper motor, wherein the second rotation stage polarizer is configured to change a polarization angle of the light beam received from the quartz cell; a light detector configured to detect the rotated light beam; and an electronic circuit board configured with circuitry to control the light source, the light detector, and the stepper motor, and to record a change in angle between the predetermined reference polarization angle and the changed polarization angle.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is a flowchart for a method of recording a Faraday rotation angle according to one embodiment.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

It will be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

Figure 1:
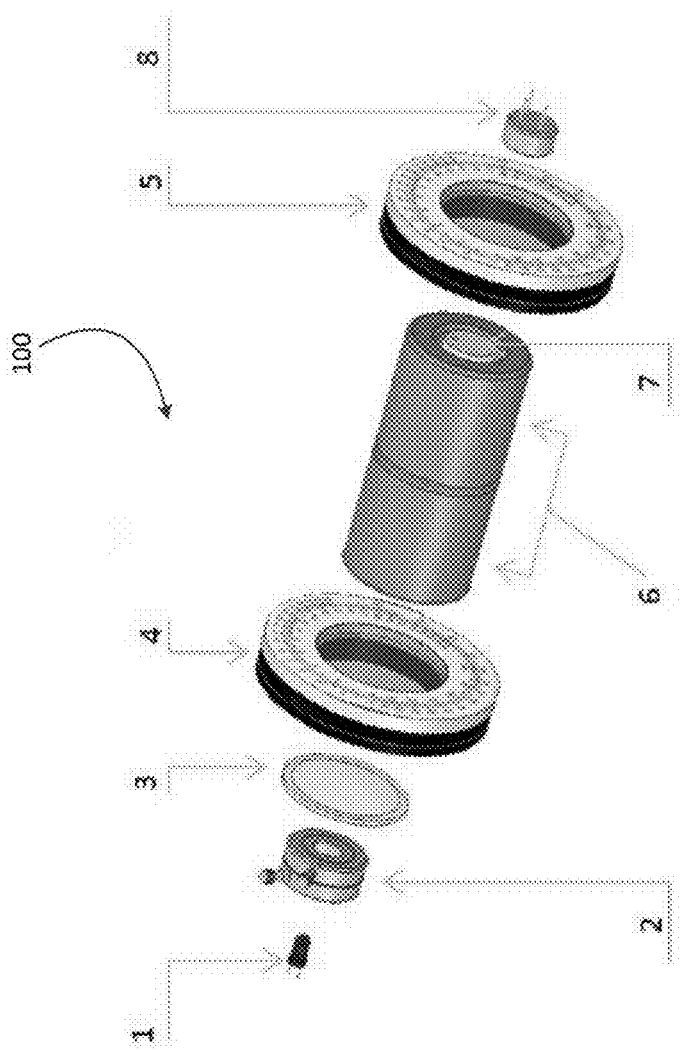
FIG. 1 is a schematic diagram of a Faraday rotation device according to one embodiment.

FIG. 1 is a schematic diagram of a Faraday rotation device 100 according to embodiments described herein. A light-emitting diode (LED) 1, such as a GaN-based blue LED is used as the light source. As used herein, a solid state LED light source refers to a type of light source using an electroluminescence phenomenon in which a material emits light in response to passage of an electric current or in response to a strong electric field. Examples of light sources include, but are not limited to semiconductor light-emitting diodes (LEDs), organic light-emitting diodes (OLEDs), polymer light-emitting diodes (PLEDs), and monolithic light-emitting diodes (MLEDs).

In one example, LED 1 is an epoxy-encased LED of 465 nm, such as an LED465E. In one embodiment, LEDs 1 that encompass the blue region wavelength range of 400-480 nm can be used.

An iris 2 (also called a pinhole), such as an Iris Diaphragm ID12/M of adjustable diameter is used to initially collimate the LED 1 output light. The output of the iris is further focused using an aspherical lens 3, such as an uncoated Aspheric Lens of focal length from 2 to 20 mm, 3 to 18 mm, 4 to 15 mm, 5 to 12 mm, 6 to 10 mm, 7 to 9 mm, or preferably about 8 mm of adjustable focusing to achieve a desired collimated light beam.

After focusing, the light is passed through a first rotation stage polarizer 4, which is kept at a predetermined reference polarization angle. An exemplary predetermined reference polarization angle is 0-10 degrees. However, a specific polarization angle is of little significance since it is simply a starting point to determine a change in rotational motion or angle subsequently calculated.

The linearly polarized light passes through a quartz cell 7 of approximately 13 mm in diameter and 10 cm in length. However, other quartz cell 7 sizes are contemplated by embodiments described herein, such as a diameter of 8-20 mm and a length of 5-20 cm. The quartz cell 7 is filled with a gaseous or transparent liquid, such as cesium, iodine, or rubidium and is coaxially inserted within a magnet such as a 2- or 3-stacked ring (e.g., multi-stacked ring) permanent magnet 6, such as a Neodymium Ring Magnet RX08X0. This provides a magnetic field strength in the range of 10,000-15,000 Ga or 11,000-14,000 Ga. In particular, a magnetic field strength of 13,400 Ga inside the quartz cell 7 encircles and is parallel to the transmitted light.

As the transmitted light exits the quartz cell 7 within the 2- or 3-stacked ring permanent magnet 6, a second rotation stage polarizer 5, such as a Polarizer LPVISE100-A is initially at the same reference polarization angle as the first rotation stage polarizer 4. A photodiode 8, such as a silicon photodiode FDS10X10 receives the light signal.

Figure 2A:
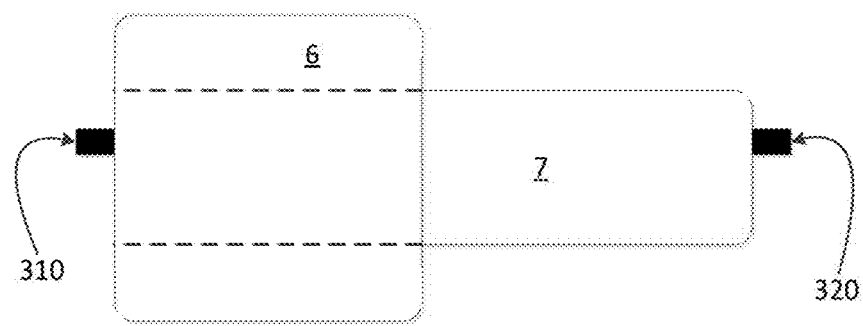
FIG. 2A illustrates a side view of a quartz cell according to one embodiment.
Figure 2B:
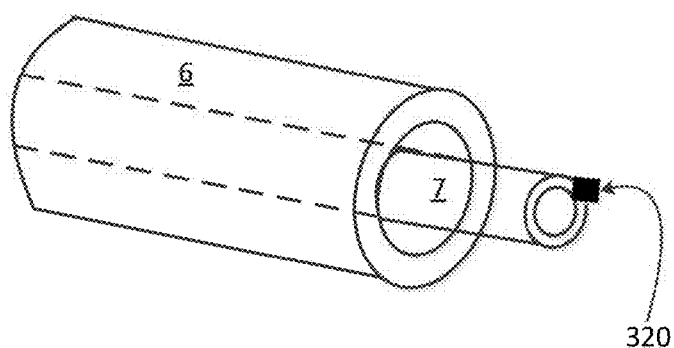
FIG. 2B illustrates a perspective view of a quartz cell according to one embodiment.

FIG. 2A illustrates a side view of the quartz cell 7 positioned inside the stacked ring permanent magnet 6. FIG. 2B illustrates a perspective view of the quartz cell 7 positioned inside the stacked ring permanent magnet 6. A first small hole 310 on the circular entrance of the quartz cell 7 and a second small hole 320 on the exit side of the quartz cell 7 are used to connect a dry vacuum pump to evacuate air and to flush and change a sample. An exemplary diameter size for the first small hole 310 and the second small hole 320 can be in the range of 0.10-1.0 mm. A sensitive pressure gauge can be connected to either hole to record entrapped sample pressure.

Figure 3:
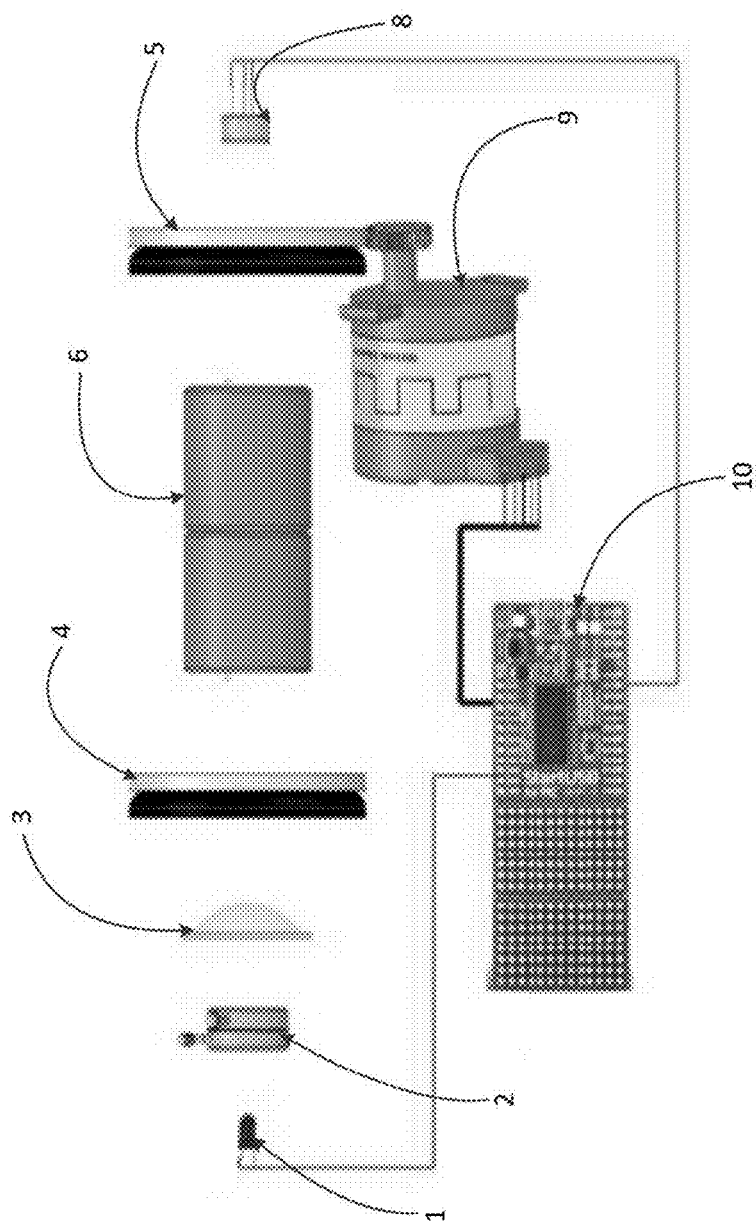
FIG. 3 illustrates a Faraday rotation device connected to a stepper motor and a circuit board according to one embodiment.

FIG. 3 illustrates the Faraday rotation device 100 connected to a stepper motor 9 and a circuit board 10. As transmitted light exits the quartz cell 7 within the 2- or 3-stacked ring permanent magnet 6, the second rotation stage polarizer 5 is made initially at the same reference polarization angle as the first rotation stage polarizer 4. The second rotation stage polarizer 5 is hooked to the stepper motor 9, such as a stepper motor 5V MIKROE-1530. The stepper motor 9 automatically changes the polarizer angle, depending on the light signal received by the photodiode 8.

Stepper motor 9 preferably operates over two stages. In a first stage, the stepper motor 9 operates in a half-step mode. As a result, the step angle of the stepper motor 9 yields a sensitivity of 0.09 degrees. In a second stage, a sensitivity of 0.01 degrees is achieved by connecting the shaft of the stepper motor 9 to a gearbox to convert the 0.09 degree sensitivity to less than 0.01 degrees. Stepper motor 9 can operate at other exemplary stages, such as a three-stage stepper motor or a four-stage stepper motor.

Circuit board 10, such as a Microchip® PIC18F2550 MIDROE-647 is connected to the LED 1, the photodiode 8, and the stepper motor 9, and is used to control the Faraday rotation device 100. Parameters of the LED 1 light source, such as the intensity, wavelength, angle etc. are controlled by the circuit board 10. Parameters of the photodiode 8, such as timing with the LED 1 light source and the stepper motor 9 are also controlled by the circuit board 10. Parameters of the stepper motor 9, such as timing and angle of the second polarizer 5 are also controlled by the circuit board 10.

Embodiments herein describe the mechanism for recording the Faraday rotation angle. The focused light is transmitted through the first rotation stage polarizer 4, which is fixed at a predetermined reference angle $\phi_o=0$. The linearly polarized light is aligned to pass through the quartz cell 7, which is surrounded by a high magnetic field source produced by the stacked ring permanent magnet 6. As a result, a rotation of the polarization direction of the transmitted light occurs by an angle of $\phi$. In an example given for illustrative purposes only, a rotation of the polarization direction of the transmitted light can range from 0.1-10 degrees.

The stepper motor 9 is connected to the second rotation stage polarizer 5. The second rotation stage polarizer 5 is initially at the same reference polarization angle as the first rotation stage polarizer 4. The stepper motor 9 automatically changes the polarization angle and hence changes the polarization angle of the second rotation stage polarizer 5, depending upon a light signal received by the photodiode 8. A feedback loop from the photodiode instructs the polarizer to rotate to a maximal/minimal photodiode signal.

The stepper motor 9 in sync with the received detector signal undergoes a rotational motion of the second rotation stage polarizer 5, which searches for a minimal signal. A minimal signal is the lowest light intensity detected by the photodiode 8. It becomes a minimal signal during the rotation of the second rotation stage polarizer 5 relative to the first rotation stage polarizer 4. When the minimal signal is located, the stepper motor 9 stops rotating and the actual angle moved from the reference point of the first rotation stage polarizer 4 is digitally recorded as the Faraday rotation angle of that specific sample at the utilized LED wavelength.

Circuit board 10 is configured with circuitry to control the light source (LED 1), the light detector (photodiode 8), and the stepper motor 9, and to record a change in angle between the predetermined reference polarization angle and the changed polarization angle. The circuit board 10 triggers the stepper motor 9 and the photodiode 8 with the same command function. The photodiode 8 takes a reading while the stepper motor 9 rotates for a full revolution to determine the minimum and maximum detected light intensities. The LED 1 can be replaced with a similar LED 1 of a different wavelength covering the range of 400-480 nm. Therefore, it is possible to record the Faraday rotation at different wavelengths within the blue region. In addition, the portability of the setup is evident as the power supplier for all setup components can be sustained using a simple DC battery.

Figure 4:
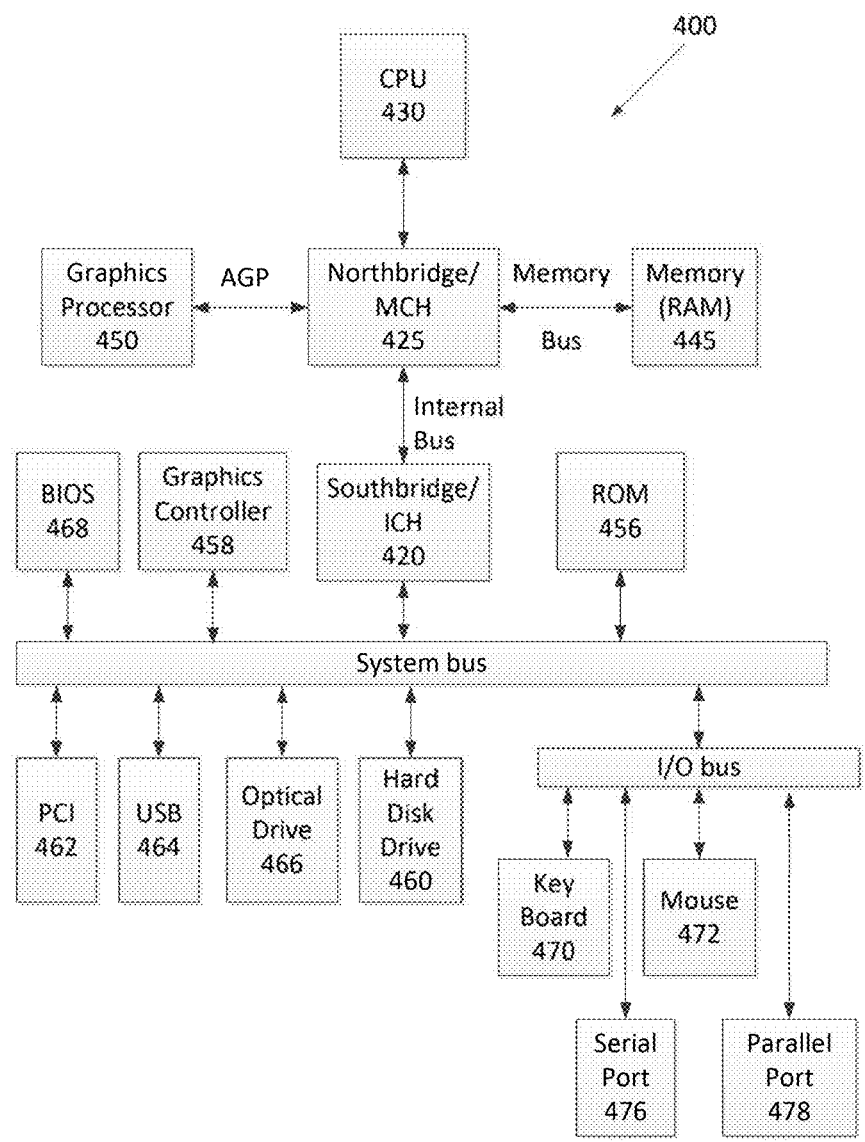
FIG. 4 is a schematic diagram of an exemplary data processing system according to one embodiment.

FIG. 4 is a schematic diagram of an exemplary data processing system, such as microchip 10 according to aspects of the disclosure described herein for operating the Faraday rotator device. The data processing system is an example of a computer in which code or instructions implementing the processes of the illustrative embodiments can be located.

In FIG. 4, data processing system 400 employs an application architecture including a north bridge and memory controller hub (NB/MCH) 425 and a south bridge and input/output (I/O) controller hub (SB/ICH) 420. The central processing unit (CPU) 430 is connected to NB/MCH 425. The NB/MCH 425 also connects to the memory 445 via a memory bus, and connects to the graphics processor 450 via an accelerated graphics port (AGP). The NB/MCH 425 also connects to the SB/ICH 420 via an internal bus (e.g., a unified media interface or a direct media interface). The CPU 430 can contain one or more processors and even can be implemented using one or more heterogeneous processor systems.

Figure 5:
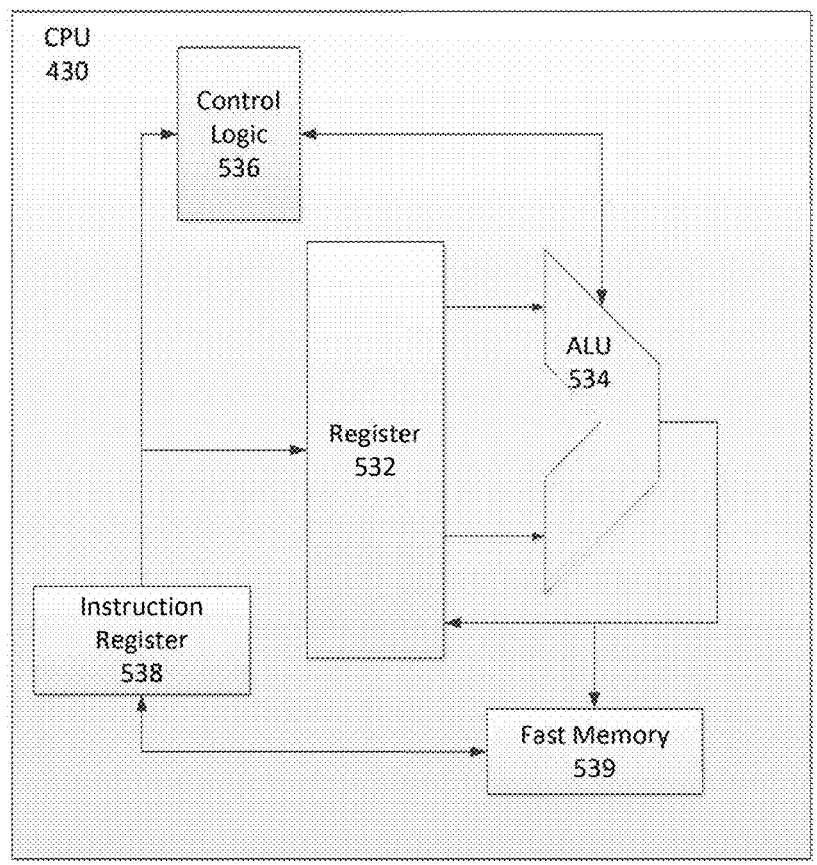
FIG. 5 illustrates an implementation of a central processing unit (CPU) according to one embodiment.

FIG. 5 illustrates an implementation of CPU 430. In one implementation, an instruction register 538 retrieves instructions from a fast memory 539. At least part of these instructions are fetched from an instruction register 538 by a control logic 536 and interpreted according to the instruction set architecture of the CPU 430. Part of the instructions can also be directed to a register 532. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 534 that loads values from the register 532 and performs logical and mathematical operations on the loaded values according to the instructions. The results from these operations can be fed back into the register 532 and/or stored in a fast memory 539. According to aspects of the disclosure, the instruction set architecture of the CPU 430 can use a reduced instruction set computer (RISC), a complex instruction set computer (CISC), a vector processor architecture, or a very long instruction word (VLIW) architecture. Furthermore, the CPU 430 can be based on the Von Neuman model or the Harvard model. The CPU 430 can be a digital signal processor, an FPGA, an ASIC, a PLA, a PLD, or a CPLD. Further, the CPU 430 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 4, the data processing system 400 can include the SB/ICH 420 being coupled through a system bus to an I/O Bus, a read only memory (ROM) 456, universal serial bus (USB) port 464, a flash binary input/output system (BIOS) 468, and a graphics controller 458. PCI/PCIe devices can also be coupled to SB/ICH 420 through a PCI bus 462.

The PCI devices can include, for example, Ethernet adapters, add-in cards, and PC cards for notebook computers. The Hard disk drive 460 and CD-ROM 466 can use, for example, an integrated drive electronics (IDE) or serial advanced technology attachment (SATA) interface. In one implementation the I/O bus can include a super I/O (SIO) device.

Further, the hard disk drive (HDD) 460 and optical drive 466 can also be coupled to the SB/ICH 420 through a system bus. In one implementation, a keyboard 470, a mouse 472, a parallel port 478, and a serial port 476 can be connected to the system bus through the I/O bus. Other peripherals and devices can be connected to the SB/ICH 420 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered. Embodiments described herein can be a combination of hardware and software, and processing circuitry by which the software is implemented.

The functions and features described herein can also be executed by various distributed components of a system. For example, one or more processors can execute these system functions, wherein the processors are distributed across multiple components communicating in a network. The distributed components can include one or more client and server machines, which can share processing, such as a cloud computing system, in addition to various human interface and communication devices (e.g., display monitors, smart phones, tablets, personal digital assistants (PDAs)). The network can be a private network, such as a LAN or WAN, or can be a public network, such as the Internet. Input to the system can be received via direct user input and received remotely either in real-time or as a batch process. Additionally, some implementations can be performed on modules or hardware not identical to those described. Accordingly, other implementations are within the scope that can be claimed.

Distributed performance of the processing functions can also be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

FIG. 6 illustrates an examplary flowchart for a method 600 of recording a Faraday rotation angle according to an aspect of the present disclosure. Method 600 includes programmable computer-executable instructions, that when used in combination with the above-described hardware devices, carry out the steps of method 600.

FIG. 6 is a flowchart for the method 600 of recording a Faraday rotation angle according to an aspect of the present disclosure. In step S610, a light beam is transmitted from a light source through a first rotation stage polarizer. A first polarization light beam is obtained at a predetermined reference angle.

In step S620, the first polarization light beam is transmitted through a quartz cell. The quartz cell is surrounded by one or more stacked ring permanent magnets.

In step S630, a polarization direction of the transmitted first polarization light beam is rotated by a predetermined rotation angle. In step S640, a second rotation stage polarizer is rotated, via a stepper. In step S650, the first polarization light beam is received at the second rotation stage polarizer.

In step S660, a minimal signal is searched from a second polarization light beam emitted from the second rotation stage polarizer, via a photodetector. In step S670, a rotation of the stepper is halted when the minimal signal is detected. In step S680, the rotation angle between the predetermined reference angle and an angle at which the rotation of the stepper halted is recorded.

Several advantages are realized using the embodiments described herein for a Faraday rotator device. The faraday rotator device described herein using an LED light source, such as a blue LED light source instead of a laser light source or a lamp light source. A permanent magnet, such as a neodymium ring permanent magnet is preferably used instead of an electromagnet or a solenoid. The Faraday rotator device described herein can be used to measure Faraday rotation in gases since it depends upon transmitted light instead of reflected light.

The combination of a photodiode, such as photodiode 8 and a stepper motor, such as stepper motor 9 is more sensitive due to the coupling of the photodiode 8 and the stepper motor 9. The Faraday rotator device described herein is more economical, is less complicated, and is portable. There is no need for signal modulation using embodiments described herein.

Embodiments described herein include the following aspects.

(1) A Faraday rotation device includes a light source configured to transmit a light beam; a first rotation stage polarizer configured to forward the light beam from the light source at a predetermined reference polarization angle; a quartz cell configured to receive the light beam from the first rotation stage polarizer at the predetermined reference polarization angle; one or more stacked ring permanent magnets coaxially fitted around the quartz cell, the one or more stacked ring permanent magnets configured to create a magnetic field encircling the quartz cell and rotate the light beam; a stepper motor configured to adjust a rotational motion of a second rotation stage polarizer connected to the stepper motor, wherein the second rotation stage polarizer is configured to change a polarization angle of the light beam received from the quartz cell; a light detector configured to detect the rotated light beam; and an electronic circuit board configured with circuitry to control the light source, the light detector, and the stepper motor, and to record a change in angle between the predetermined reference polarization angle and the changed polarization angle.

(2) The Faraday rotation device of (1), further includes an iris diaphragm configured to collimate the light beam outputted from the light source.

(3) The Faraday rotation device of either one of (1) or (2), further includes an aspheric lens configured to focus the light beam outputted from the light source.

(4) The Faraday rotation device of any one of (1) through (3), wherein the light source comprises a light-emitting diode (LED).

(5) The Faraday rotation device of any one of (1) through (4), wherein the LED is configured to operate within a wavelength range of 400-480 nm.

(6) The Faraday rotation device of any one of (1) through (5), wherein the light detector comprises a silicon photodiode.

(7) The Faraday rotation device of any one of (1) through (6), wherein the one or more stacked ring permanent magnets are configured to produce a magnetic field inside the quartz cell parallel to the transmitted light beam from the light source.

(8) The Faraday rotation device of any one of (1) through (7), wherein the stepper motor is a two-stage stepper motor.

(9) A method of recording a Faraday rotation angle includes transmitting a light beam from a light source through a first rotation stage polarizer at a predetermined reference angle to obtain a first polarization light beam; transmitting the first polarization light beam through a quartz cell surrounded by one or more stacked ring permanent magnets; rotating, via the one or more stacked ring permanent magnets, a polarization direction of the transmitted first polarization light beam by a predetermined rotation angle; rotating a second rotation stage polarizer, via a stepper; receiving the first polarization light beam at the second rotation stage polarizer; searching, via a photodetector, for a minimal signal from a second polarization light beam emitted from the second rotation stage polarizer; halting a rotation of the stepper when the minimal signal is detected; and recording, via an electronic circuit board, a rotation angle between the predetermined reference angle and an angle at which the rotation of the stepper halted.

(10) The method of recording a Faraday rotation angle of (9), further includes collimating, via an iris diaphragm, the light beam outputted from the light source.

(11) The method of recording a Faraday rotation angle of either one of (9) or (10), further includes focusing, via an aspheric lens, the light beam outputted from the light source.

(12) The method of recording a Faraday rotation angle of any one of (9) through (11), further includes producing, via the one or more stacked ring permanent magnets, a magnetic field inside the quartz cell parallel to the transmitted light beam from the light source.

(13) A Faraday rotation device includes a light source configured to transmit a light beam; a first rotation stage polarizer configured to forward the light beam from the light source at a predetermined reference polarization angle; a quartz cell configured to receive the light beam from the first rotation stage polarizer at the predetermined reference polarization angle; one or more stacked ring permanent magnets coaxially fitted around the quartz cell, the one or more stacked ring permanent magnets configured to create a magnetic field encircling the quartz cell and rotate the light beam; a stepper motor connected to a second rotation stage polarizer, wherein the second rotation stage polarizer is configured to change a polarization angle of the light beam received from the quartz cell; a light detector configured to detect the rotated light beam; and processing circuitry. The processing circuitry is configured to transmit the light beam from the light source through the first rotation stage polarizer to obtain a first polarization light beam; transmit the first polarization light beam through the quartz cell; rotate the second rotation stage polarizer, via the stepper; search for a minimal signal from a second polarization light beam emitted from the second rotation stage polarizer; halt a rotation of the stepper when the minimal signal is detected; and record a rotation angle between the predetermined reference angle and an angle at which the rotation of the stepper halted.

(14) The Faraday rotation device of (13), wherein the light source comprises a light-emitting diode (LED).

(15) The Faraday rotation device of either one of (13) or (14), wherein the LED is configured to operate within a wavelength range of 400-480 nm.

(16) The Faraday rotation device of any one of (13) through (15), wherein the light detector comprises a silicon photodiode.

(17) The Faraday rotation device of any one of (13) through (16), wherein the stepper motor is a two-stage stepper motor.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A Faraday rotation device, comprising:
a light source configured to transmit a light beam;
a first rotation stage polarizer configured to forward the light beam from the light source at a predetermined reference polarization angle;
a quartz cell configured to receive the light beam from the first rotation stage polarizer at the predetermined reference polarization angle, the quartz cell including a first hole on a circular entrance of the quartz cell and a second hole on a circular exit of the quartz cell, the first hole and the second hole creating a tunnel within the quartz cell structure and being connectable to a dry vacuum pump to evacuate air, and to flush and change a sample;
one or more stacked ring permanent magnets coaxially fitted around the quartz cell, the one or more stacked ring permanent magnets configured to create a magnetic field encircling the quartz cell and rotate the light beam;
a stepper motor configured to adjust a rotational motion of a second rotation stage polarizer connected to the stepper motor, wherein the second rotation stage polarizer is configured to change a polarization angle of the light beam received from the quartz cell;
a light detector configured to detect the rotated light beam; and
an electronic circuit board configured with circuitry to control the light source, the light detector, and the stepper motor, and to record a change in angle between the predetermined reference polarization angle and the changed polarization angle.

2. The Faraday rotation device of claim 1, further comprising:
an iris diaphragm configured to collimate the light beam outputted from the light source.

3. The Faraday rotation device of claim 1, further comprising:
an aspheric lens configured to focus the light beam outputted from the light source.

4. The Faraday rotation device of claim 1, wherein the light source comprises a light-emitting diode (LED).

5. The Faraday rotation device of claim 4, wherein the LED is configured to operate within a wavelength range of 400-480 nm.

6. The Faraday rotation device of claim 1, wherein the light detector comprises a silicon photodiode.

7. The Faraday rotation device of claim 1, wherein the one or more stacked ring permanent magnets are configured to produce a magnetic field inside the quartz cell parallel to the transmitted light beam from the light source.

8. The Faraday rotation device of claim 1, wherein the stepper motor is a two-stage stepper motor.

9. The Faraday rotation device according to claim 1, further comprising a dry vacuum pump configured to connect to at least one of the first hole and the second hole, and provide suction for evacuating air and flushing and changing the sample within the quartz cell.

10. A method of recording a Faraday rotation angle, the method comprising:
- transmitting a light beam from a light source through a first rotation stage polarizer at a predetermined reference angle to obtain a first polarization light beam;
- transmitting the first polarization light beam through a quartz cell surrounded by one or more stacked ring permanent magnets, the quartz cell including a first hole on a circular entrance of the quartz cell and a second hole on a circular exit of the quartz cell, the first hole and the second hole creating a tunnel within the quartz cell structure and being connectable to a dry vacuum pump to evacuate air, and to flush and change a sample;
- rotating, via the one or more stacked ring permanent magnets, a polarization direction of the transmitted first polarization light beam by a predetermined rotation angle;
- rotating a second rotation stage polarizer, via a stepper;
- receiving the first polarization light beam at the second rotation stage polarizer;
- searching, via a photodetector, for a minimal signal from a second polarization light beam emitted from the second rotation stage polarizer;
- halting a rotation of the stepper when the minimal signal is detected; and
- recording, via an electronic circuit board, a rotation angle between the predetermined reference angle and an angle at which the rotation of the stepper halted.

11. The method of claim 10, further comprising:
collimating, via an iris diaphragm, the light beam outputted from the light source.

12. The method of claim 10, further comprising:
focusing, via an aspheric lens, the light beam outputted from the light source.

13. The method of claim 10, further comprising:
producing, via the one or more stacked ring permanent magnets, a magnetic field inside the quartz cell parallel to the transmitted light beam from the light source.

14. A Faraday rotation device, comprising:
- a light source configured to transmit a light beam;
- a first rotation stage polarizer configured to forward the light beam from the light source at a predetermined reference polarization angle;
- a quartz cell configured to receive the light beam from the first rotation stage polarizer at the predetermined reference polarization angle, the quartz cell including a first hole on a circular entrance of the quartz cell and a second hole on a circular exit of the quartz cell, the first hole and the second hole creating a tunnel within the quartz cell structure and being connectable to a dry vacuum pump to evacuate air, and to flush and change a sample;
- one or more stacked ring permanent magnets coaxially fitted around the quartz cell, the one or more stacked ring permanent magnets configured to create a magnetic field encircling the quartz cell and rotate the light beam;
- a stepper motor connected to a second rotation stage polarizer, wherein the second rotation stage polarizer is configured to change a polarization angle of the light beam received from the quartz cell;
- a light detector configured to detect the rotated light beam; and
- processing circuitry configured to
  - transmit the light beam from the light source through the first rotation stage polarizer to obtain a first polarization light beam;
  - transmit the first polarization light beam through the quartz cell;
  - rotate the second rotation stage polarizer, via the stepper;
  - search for a minimal signal from a second polarization light beam emitted from the second rotation stage polarizer;
  - halt a rotation of the stepper when the minimal signal is detected; and
  - record a rotation angle between the predetermined reference angle and an angle at which the rotation of the stepper halted.

15. The Faraday rotation device of claim 14, wherein the light source comprises a light-emitting diode (LED).

16. The Faraday rotation device of claim 15, wherein the LED is configured to operate within a wavelength range of 400-480 nm.

17. The Faraday rotation device of claim 14, wherein the light detector comprises a silicon photodiode.

18. The Faraday rotation device of claim 14, wherein the stepper motor is a two-stage stepper motor.

* * * * *